(12) United States Patent
Lin et al.

(10) Patent No.: US 12,718,280 B2
(45) Date of Patent: Aug. 25, 2026

(54) GENERATING BUNDLES OF ITEMS BY USING A GENERATIVE MODEL

(71) Applicant: Maplebear Inc., San Francisco, CA (US)

(72) Inventors: Shih-Ting Lin, Santa Clara, CA (US); Saurav Manchanda, Seattle, WA (US); Prithvishankar Srinivasan, Seattle, WA (US); Shishir Kumar Prasad, Fremont, CA (US); Brian Lin, La Canada Flintridge, CA (US); Michael Parrott, Toronto (CA)

(73) Assignee: Maplebear Inc., San Francisco, CA (US)

( * ) Notice: Subject to any disclaimer, the term of this patent is extended or adjusted under 35 U.S.C. 154(b) by 271 days.

(21) Appl. No.: 18/444,586

(22) Filed: Feb. 16, 2024

(65) Prior Publication Data

US 2025/0265629 A1 Aug. 21, 2025

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................ G06Q 30/06–08
See application file for complete search history.

(56) References Cited

U.S. PATENT DOCUMENTS

2023/0099386 A1* 3/2023 Zhang ................ G06Q 30/0631 705/26.64
2024/0420205 A1* 12/2024 Unnikrishnan .... G06Q 30/0625

OTHER PUBLICATIONS

Sun, Zhu et al., “Adaptive In-Context Learning with Large Language Models for Bundle Generation”, Proceedings of xx (xx ’18), Jun. 3-5, 2018, Woodstock, NY (Year: 2018).*

* cited by examiner

*Primary Examiner* — Ethan D Civan
(74) *Attorney, Agent, or Firm* — Fenwick & West LLP

(57) ABSTRACT

An online concierge system generates a plurality of bundles based in part on a seed list of contexts by generating one or more prompts that are provided to a machine learned model, where for a first context of the seed list of contexts, a prompt instructs the machine learned model to determine: a first bundle for the given context, where the first bundle includes a list of products, a title, and an explanation. The plurality of bundles is stored in a datastore. The system selects, for a customer, the first bundle from the plurality of bundles in the datastore, and generates a list of items from an online catalog that corresponds to the list of products of the first bundle. The system provides the list of items, the title, and the explanation for presentation to a customer client device of the customer.

17 Claims, 6 Drawing Sheets

GENERATING BUNDLES OF ITEMS BY USING A GENERATIVE MODEL

BACKGROUND

In online systems, there is a growing demand for personalized product recommendations that can effectively engage customers and drive sales. Traditional approaches to generating product bundles for customers have relied on manual curation or rule-based systems, which can be time-consuming, labor-intensive, and limited in their ability to adapt to changing customer preferences and market trends. These approaches often lack the ability to provide a comprehensive and dynamic understanding of the relationships between products within a bundle.

SUMMARY

In accordance with one or more aspects of the disclosure, bundling of products for an online system, such as an online concierge system, using one or more machine learned models (e.g., of an artificial intelligence system) is described. The online system may generate a plurality of bundles based in part on a seed list of contexts by generating one or more prompts to provide to a machine learned model. For a given context of the seed list of contexts, a prompt instructs the machine learned model to determine a bundle for the given context. The bundle includes a list of products, a title for the bundle, and an explanation that describes a relationship between the list of products. The online system may store the plurality of bundles in a datastore.

The online system may select, for one or more customers, one or more bundles from the plurality of bundles in the datastore. The online system may generate lists of items from an online catalog that corresponds to lists of products of the one or more bundles. The online system may provide the lists of items for presentation to one or more customer client devices that are associated with the one or more customers. For a given list of items provided to a customer client device, the given list of items may be presented on the customer client device as a single item that includes the title and the explanation of the bundle.

In some aspects, the techniques described herein relate to a method, performed at a computer system including a processor and a non-transitory computer readable medium, including: generating a plurality of bundles based in part on a seed list of contexts by generating one or more prompts to provide to a machine learned model, where for a first context of the seed list of contexts, a prompt instructs the machine learned model to determine: a first bundle for the first context, where the first bundle includes a list of products, a title for the first bundle, and an explanation that describes a relationship between the list of products; storing the plurality of bundles in a datastore; selecting, for a customer, the first bundle from the plurality of bundles in the datastore; generating a list of items from an online catalog that corresponds to the list of products of the first bundle; and providing the list of items for presentation to a customer client device of the customer, wherein the list of items is presented on the customer client device as a single item that includes the title and the explanation of the first bundle.

In some aspects, the techniques described herein relate to a computer program product including a non-transitory computer readable storage medium having instructions encoded thereon that, when executed by a processor of a computer system, cause the processor to: generate a plurality of bundles based in part on a seed list of contexts by generating one or more prompts to provide to a machine learned model, where for a first context of the seed list of contexts, a prompt instructs the machine learned model to determine: a first bundle for the first context, where the first bundle includes a list of products, a title for the first bundle, and an explanation that describes a relationship between the list of products; store the plurality of bundles in a datastore; select, for a customer, the first bundle from the plurality of bundles in the datastore; generate a list of items from an online catalog that corresponds to the list of products of the first bundle; and provide the list of items for presentation to a customer client device of the customer, wherein the list of items is presented on the customer client device as a single item that includes a title of the first bundle, and an explanation of the first bundle.

In some aspects, the techniques described herein relate to a computer system including: a processor; and a non-transitory computer readable storage medium having instructions encoded thereon that, when executed by the processor, cause the computer system to: generate a plurality of bundles based in part on a seed list of contexts by generating one or more prompts to provide to a machine learned model, where for a first context of the seed list of contexts, a prompt instructs the machine learned model to determine: a first bundle for the first context, where the first bundle includes a list of products, a title for the first bundle, and an explanation that describes a relationship between the list of products; store the plurality of bundles in a datastore; select, for a customer, the first bundle from the plurality of bundles in the datastore; generate a list of items from an online catalog that corresponds to the list of products of the first bundle; and provide the list of items for presentation to a customer client device of the customer, wherein the list of items is presented on the customer client device as a single item that includes a title of the first bundle, and an explanation of the first bundle . . .

DETAILED DESCRIPTION

Figure 1:
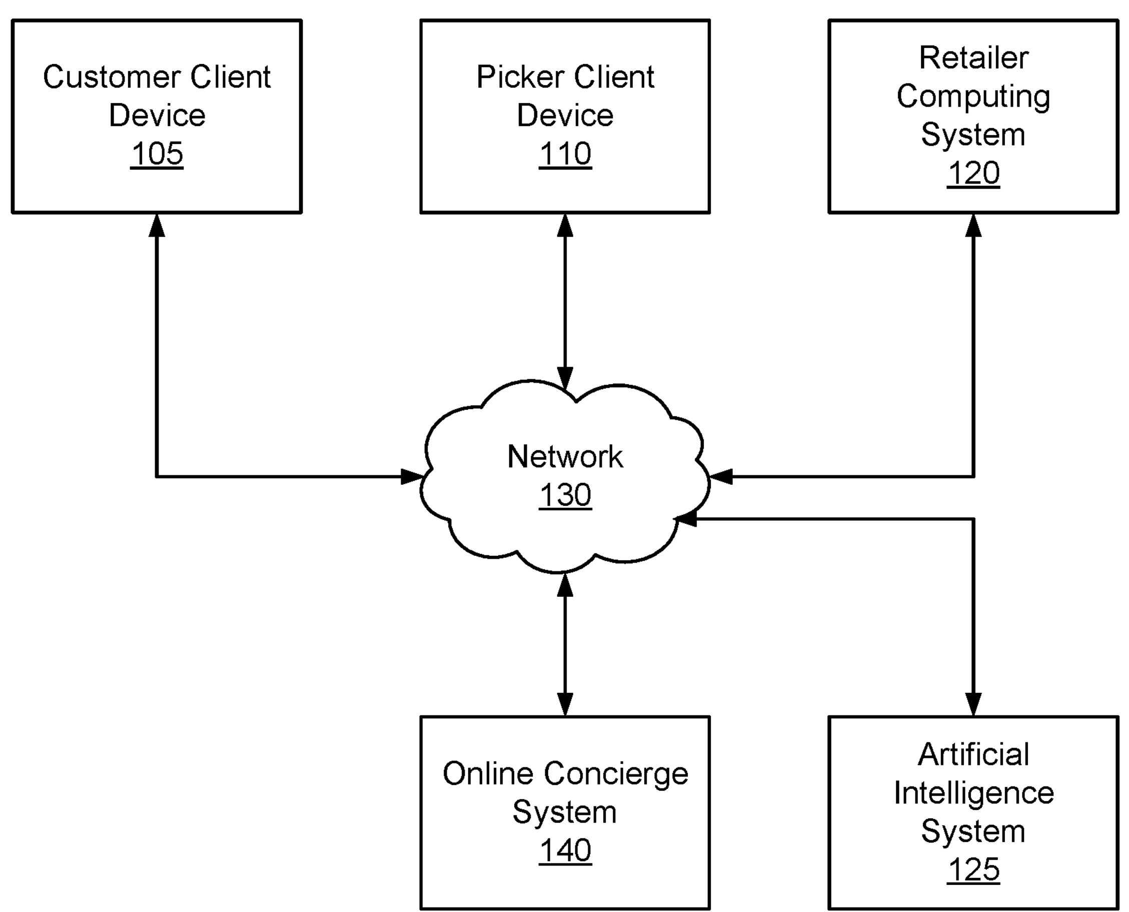
FIG. 1 illustrates an example system environment for an online concierge system, in accordance with one or more embodiments.

FIG. 1 illustrates an example system environment 100 for an online concierge system 140, in accordance with one or more embodiments. The system environment 100 illustrated in FIG. 1 includes a customer client device 105, a picker client device 110, a retailer computing system 120, an artificial intelligence (AI) system 125, a network 130, and an online concierge system 140. Alternative embodiments may include more, fewer, or different components from those illustrated in FIG. 1, and the functionality of each component may be divided between the components differently from the description below. For example, some or all of the functionality of the AI system 125 may be performed by the online concierge system 140. Additionally, each component may perform their respective functionalities in response to a request from a human, or automatically without human intervention.

As used herein, customers, pickers, and retailers may be generically referred to as "users" of the online concierge system 140. Additionally, while one customer client device 105, picker client device 110, and retailer computing system 120 are illustrated in FIG. 1, any number of customers, pickers, and retailers may interact with the online concierge system 140. As such, there may be more than one customer client device 105, picker client device 110, or retailer computing system 120.

The customer client device 105 is a client device through which a customer may interact with the picker client device 110, the retailer computing system 120, or the online concierge system 140. The customer client device 105 can be a personal or mobile computing device, such as a smartphone, a tablet, a laptop computer, or desktop computer. In some embodiments, the customer client device 105 executes a client application that uses an application programming interface (API) to communicate with the online concierge system 140.

A customer uses the customer client device 105 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

A "bundle" describes two or more related products that are made available to purchase in a single transaction. A bundle may include, e.g., a list of products and/or product categories, a title for the bundle, and an explanation that describes a relationship between the list of products and/or product categories. "Updated bundles" are bundles that have been scored and reconciled to an online catalog of the online concierge system 140. In some embodiments, the bundle may also include a score. In some embodiments, the two or more related items may be grouped together under a single SKU. The items in the bundle and/or updated bundle are related to each other in accordance with some type of context. For example, context may be an occasion (e.g., holiday, event, meal, etc.), product category (e.g., dips, dairy, etc.), or some combination thereof. For example, context may be a Sunday Football, and a bundle for Sunday Football may include items (chips, salsa, beer, hotdogs, hotdog buns, etc.) that are commonly consumed in conjunction with Sunday Football. Another context may be a category of laundry items, and the bundled items may be, e.g., laundry detergent, bleach, and fabric softener.

The customer client device 105 presents an ordering interface to the customer. The ordering interface is a user interface that the customer can use to place an order with the online concierge system 140. The ordering interface may be part of a client application operating on the customer client device 105. The ordering interface may present one or more storefronts for different retailer computing systems 120 and/or the online concierge system 140. A storefront may be presented as part of a page that includes an item area that lists a plurality of items that are for sale. In some embodiments, the storefront may present some or all of the plurality of items for sale using a carousel. Some of the plurality of items presented for sale may be updated bundles. In some embodiments, some of the plurality of items presented may include a list of items that are presented as a single item. The list of items may include a title of a bundle associated with the list of items and an explanation that describes a relationship between the list of items.

The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 105 may receive additional content from the online concierge system 140 to present to a customer. For example, the customer client device 105 may receive coupons, recipes, or item suggestions. The customer client device 105 may present the received additional content to the customer as the customer uses the customer client device 105 to place an order (e.g., as part of the ordering interface).

Additionally, the customer client device 105 includes a communication interface that allows the customer to communicate with a picker that is servicing the customer's order. This communication interface allows the user to input a text-based message to transmit to the picker client device 110 via the network 130. The picker client device 110 receives the message from the customer client device 105 and presents the message to the picker. The picker client device 110 also includes a communication interface that allows the picker to communicate with the customer. The picker client device 110 transmits a message provided by the picker to the customer client device 105 via the network 130. In some embodiments, messages sent between the customer client device 105 and the picker client device 110 are transmitted through the online concierge system 140. In addition to text messages, the communication interfaces of the customer client device 105 and the picker client device 110 may allow the customer and the picker to communicate through audio or video communications, such as a phone call, a voice-over-IP call, or a video call.

The picker client device 110 is a client device through which a picker may interact with the customer client device 105, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 105 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 105 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The AI system 125 is configured to apply prompts to one or more machine learned models to generate bundles. The AI system 125 includes one or more machine learned models. The one or more machine learned models may be generative machine learned models. The AI system 125 may receive prompts from the online concierge system 140 to generate bundles for various contexts, and provide bundles for the various contexts. In some embodiments, AI system 125 may be a third-party server that is independent and separate from the online concierge system 140.

In one or more embodiments, at least some of the one or more machine learned models are large language models (LLMs) that are trained on a large corpus of training data to generate outputs for the natural language processing (NLP) tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the AI system 125. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The customer client device 105, the picker client device 110, the retailer computing system 120, the AI system 125, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 105 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 105 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The online concierge system 140 generates prompts to provide to the AI system 125 (for providing to the one or more machine learned models). The prompts may be based in part on contexts from a seed list of contexts. A prompt may instruct the one or more machine learned models to determine a bundle for one or more contexts (e.g., of the seed list of contexts). The online concierge system 140 receives bundles (e.g., list of products in each bundle, title for each bundle, explanations describing relationships between products for each of the lists of products) that were generated using the one or more machine learned models and the prompts. The online concierge system 140 may store the received bundles in a datastore. In this manner, the online concierge system 140 can use the AI system 125 to generate a large set of bundles for different contexts.

The online concierge system 140 may select, for a customer, a bundle from the bundles in the datastore. The selection may be based on, e.g., an occasion that is associated with the customer. The online concierge system 140 may select a subset of the bundles that are associated with the occasion (e.g., based in part on titles), score the bundles of the subset, and select the bundle based on the scoring. The online concierge system 140 may generate a list of items from an online catalog that corresponds to a list of products and/or product categories of the bundle. For example, the online concierge system 140 may link items in the list of products of the bundle to corresponding item information (e.g., item category and/or item) in the online catalog to generate the list of items. The online concierge system 140 may provide, for presentation, the list of items to the customer client device 105 of the customer. The list of items may be presented on the customer client device 105 as a single item that includes the title and the explanation of the bundle.

The online concierge system 140 may de-duplicate the bundles to remove, e.g., duplicative bundles in the datastore. The online concierge system 140 is described in further detail below with regards to FIG. 2.

Figure 2:
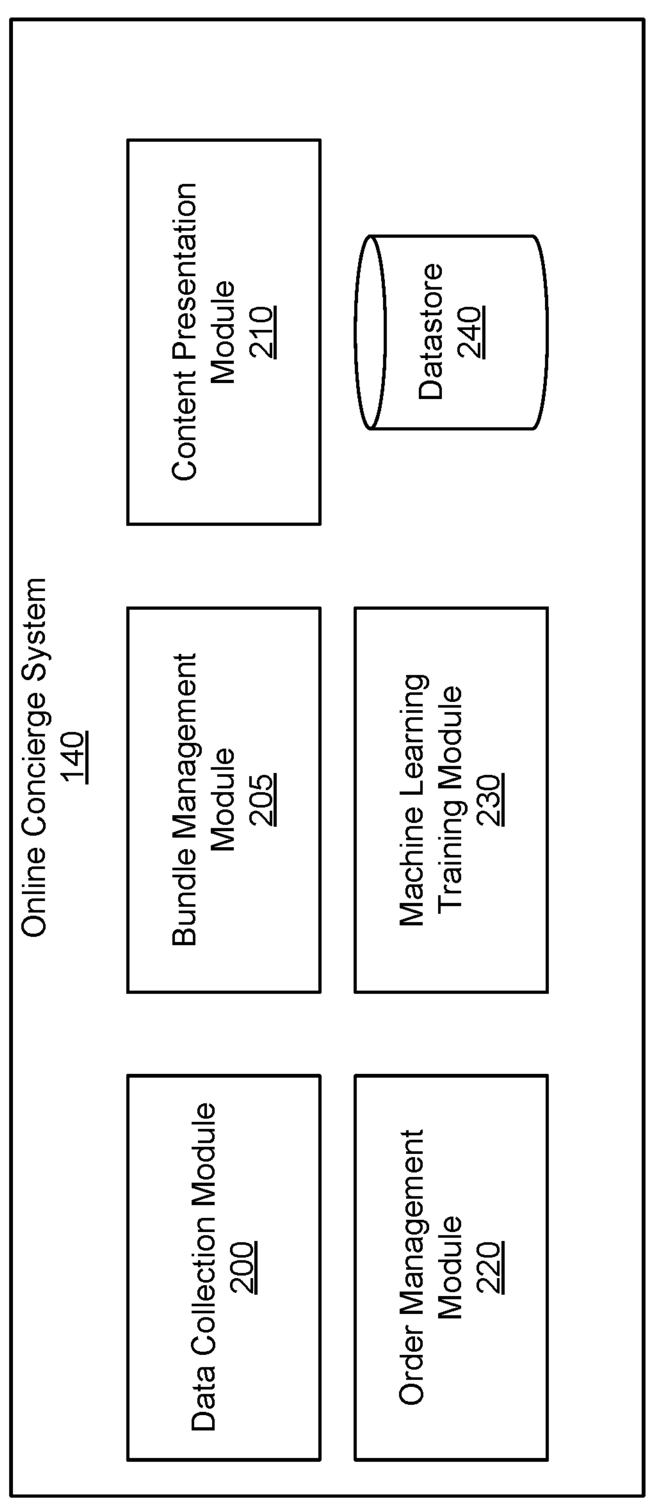
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a bundle management module 205, a content presentation module 210, an order management module 220, a machine learning training module 230, and a datastore 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the datastore 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments.

The data collection module 200 may monitor engagement of customers with items of the online catalog. The customer data may include engagement data of customer for items of the online catalog. Engagement data describes which items of the online catalog the customer has previously selected (e.g., to view, to add to cart, to purchase, etc.). For example, the engagement data may indicate a customer has previously engaged with a list of items associated with a bundle.

The customer data also may include default settings established by the customer, such as a default retailer/retailer location, payment instrument, delivery location, or delivery timeframe. The data collection module 200 may collect the customer data from sensors on the customer client device 105 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 105.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The bundle management module 205 generates one or more prompts to provide to the AI system 125. In some embodiments, generation of a prompt includes updating a previously generated prompt with new information. The one or more prompts may be configured to instruct the machine learned model(s) of the AI system 125 to determine one or more bundles for each of one or more contexts (e.g., 10 unique bundles for each context of a plurality of different contexts). The one or more contexts may be part of a list of seed contexts. The list of seed contexts is a list of different contexts that can be used to create a corpus of bundles that correspond to a wide variety of different contexts.

The prompt instructs the machine learned model(s) to generate one or more bundles that includes a list of products for one or more contexts (e.g., an occasion (e.g., holiday, event, meal, etc.), product category (e.g., dips, dairy, etc.), etc.). In some embodiments, the prompt instructs the machine learned model(s), for the one or more contexts, to generate one or more bundles that also include a respective title for each of the one or more bundles, and a respective explanation (describes a relationship between a list of products of a bundle) for each of the one or more bundles. For example, the bundle management module 205 may generate a prompt that instructs the machine learned model(s) of the AI system 125 to determine a bundle for a given context where the bundle includes a list of products, a title for the bundle, and an explanation that describes a relationship between the list of products. The bundle management module 205 provides the one or more prompts to the AI system 125.

For example, a prompt may be: "You are a helpful grocery assistant. You are an expert in grocery recommendations. Your goal is to recommend product bundles of 2 products or more that are generally bought together on a particular occasion. They might be bought together for recipes/meals/gifts/dietary preferences. Also, provide a catchy title for the bundle. The recommended products should be consumer packaged goods-friendly and monetizable. For each given occasion, generate 10 diverse bundles. Generate the output as a JSON string, with just one key: bundles. The bundles should be a list, and each bundle should have exactly three keys: title, products, and explanation."

The bundle management module 205 receives one or more bundles from the AI system 125. The received one or more bundles were generated using the machine learned model(s) of the AI system 125 and the one or more prompts. The received one or more bundles include respective lists of products and/or product categories, and may also include respective titles, respective explanations, or both. The bundle management module 205 may store the received one or more bundles in the datastore 240.

In some embodiments, the bundle management module 205 updates some or all of the received one or more bundles. To update a bundle, the bundle management module 205 may, e.g., link products in the list of products and/or product categories of a bundle to corresponding item information in an online catalog, score the bundle based in part on one or more scoring criteria, or some combination thereof.

In some embodiments, the products listed in a received bundle are not already associated with item information in the online catalog. Linking acts to associate a product with item information (e.g., item and/or item category of the online catalog) for items that may be listed for sale via the online concierge system 140. Accordingly, the bundle management module 205 (and/or in some embodiments the content presentation module 210) may link products in the list of products and/or product categories of a bundle to corresponding item information in the online catalog. The linking may be rule based, embedding based, or some combination thereof. Rule based linking may use, e.g., string matching to link products (from a list of products of a bundle) to corresponding item information (e.g., item and/or item category of the online catalog). Embedding based linking may use an embedding model to generate embeddings for products (from a list of products of a bundle). An embedding model may be a machine learned model that generates embedding information for a product, item, item category, or some combination thereof. The embedding model may also be used to generate embeddings for item information (e.g., item and/or item category) of the online catalog. The bundle management module 205 may compute similarity scores (e.g., via cosine similarity) for the embeddings of the products and the embeddings for the item information, and for a given product, select the item information associated with the highest similarity score for linking to the product.

For example, the bundle management module 205 may apply item information of the online catalog to the embedding model to generate a first set of embeddings for the item information. The bundle management module 205 may apply a list of products of a bundle to the embedding model to generate a second set of embeddings for the first list of products. The bundle management module 205 may determine similarity scores between the second set of embeddings and at least some of the first set of embeddings. For each product of the list of products, the bundle management module 205 may link the product to corresponding item information associated with a highest similarity score (for that product).

The bundle management module 205 scores a received bundle based in part on one or more scoring criteria. Scores for the bundles may be used by the online concierge system 140 and/or one or more other components of the system environment 100 to rank updated bundles for presentation to customers using the one or more customer client devices 105. In some embodiments, the bundle management module 205 may score a bundle by determining an engagement metric for item information (e.g., item and/or item category) associated with each product of the bundle. The bundle management module 205 may sum the determined engagement metrics to determine a score for the bundle. In the above embodiment, scoring criteria corresponds to the engagement metrics for the item information.

In some embodiments, the bundle management module 205 uses a co-occurrence model to estimate a probability that a set of item information (e.g., associated with the list of products) and/or products in the list of products could be brought together. The bundle management module 205 may use the estimated probability to score the bundle. The score may be used for the updated bundle. The co-occurrence model may be a machined learned model that is trained from co-purchase engagement data to estimate, for a given set of item information and/or products, a probability that the set of item information and/or products in the list of products could be brought together. In the above embodiment, scoring criteria corresponds to the determined probability.

In some embodiments, the bundle management module 205 updates scores for bundles based in part on customer engagements with bundles (e.g., number of conversions associated with a particular bundle). For example, if a bundle is presented to a plurality of different customers (e.g., via customer client devices), the bundle management module 205 can compute the history conversion rate of the bundle, and use that as the score. In some embodiments, the bundle management module 205 may also compute an average real-time in-store availability of items in a bundle (e.g., at a store and/or storefront), and adjust the score of a bundle up or down based on item availability.

In some embodiments, the bundle management module 205 may update the prompt based in part on a score of a bundle. The updated prompt may then be applied to the machine learned model to determine a new set of one or more bundles for the one or more contexts. For example, if the score is below a particular threshold value, the bundle management module 205 may update the prompt and provide the updated prompt the AI system 125 for generation of new bundles that potentially have higher scores. This may be an iterative process that continues until a score of a bundle is at least the threshold value.

Note, given two different contexts, the machine learned model(s) of the AI system 125 may potentially return semantically similar or duplicate bundles (e.g., bundles that each have the same list of products. For example, given a context of "crackers" the machine learned model(s) may output a bundle that lists "cabernet sauvignon wine," "brie cheese," and "butter crackers." And given a different context (e.g., "wine and cheese pairing") the machine learned model (s) may output a bundle that includes the same list of products (note it may include a different title and/or explanation). The bundle management module 205 may filter out (also referred to as de-duplication) such types of duplicate bundles and/or updated duplicate bundles. In some embodiments, the bundle management module 205 may de-duplicate bundles by removing bundles whose item information (e.g., item category) is a subset of another bundle. The bundle management module 205 may group bundles of a plurality of bundles based in part on, e.g., having a high semantic similarity in titles, similarity of item information, or some combination thereof. For example, the bundle management module 205 may generate similarities between titles of bundles, and group the bundles based on the determined similarities. In another example, the bundle management module 205 identifies which bundles have matching item information and forms groups of bundles where members of the group have the same item information. The bundle management module 205 may randomly select one bundle of each group to keep (e.g., would be available for presentation to the one or more customer client devices 105) and remove (i.e., would not be available for presentation to the one or more customer client devices 105) the remaining bundles. The bundle management module 205 may form a de-duplicated set of bundles using the selected bundles. Note that while de-duplication is described above in the context of de-duplicating bundles, de-duplication may also be used on updated bundles.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface (e.g., in the item area) with items that the customer may select for adding to their order. In some embodiments, the content presentation module 210 presents a catalog (also referred to as an "online catalog") of all items that are available to the customer, which the customer can browse to select items to order. Some of the presented items are from one or more updated bundles, and items in a given updated bundle are presented together.

The content presentation module 210 also may identify items that the customer is most likely to order and present those items to the customer. For example, the content presentation module 210 may score items and rank the items based on their scores. In some embodiments, the content presentation module 210 performs one or more of the scoring techniques described above of the bundle management module 205. In some embodiments, the content presentation module 210 may also update scores of bundles and/or updated bundles. The content presentation module 210 displays the items with scores that exceed some threshold (e.g., the top n items or the p percentile of items).

The content presentation module 210 may select, for a customer, a first bundle from the bundles in the datastore 240. For example, the content presentation module 210 may determine a context (e.g., occasion) of potential interest to the customer based in part on customer data associated with the customer. The content presentation module 210 may select a subset of the bundles in the datastore 240 that are associated with the context based in part on titles of the bundles. The content presentation module 210 may score each bundle of the subset (e.g., via one or more of the scoring techniques described above of the bundle management module 205), and select the first bundle from the subset based in part on the scoring.

In some embodiments, the content presentation module 210 may use customer data (e.g., engagement data) and a machine learned model to select a bundle. For example, the content presentation module 210 may apply engagement data for the customer to a model trained to score the plurality of bundles (e.g., in the datastore 240) and select a bundle with a highest score. Note in some embodiments, the content presentation module 210 may also remove bundles from the plurality of bundles that have engagement scores below some threshold value (e.g., to remove bundles that a customer is not likely to engage with).

The content presentation module 210 may generate a list of items from an online catalog that corresponds to the list of products of the first bundle. For example, the content presentation module 210 may link the list of products to corresponding items via, e.g., one or more of the linking methodologies (e.g., rule based, embedding based, or some combination thereof) described above with regard to the bundle management module 205.

The content presentation module 210 may provide a list of items associated with the first bundle for presentation to a customer client device of the customer. The list of items may be presented on the customer client device as a single item that includes a title and explanation of the first bundle.

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the datastore 240.

In some embodiments, the content presentation module 210 scores items based on a search query received from the customer client device 105. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. In some embodiments, the item may be part of a bundle and/or updated bundle. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 105 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 105 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 105 and the picker client device 110. As noted above, a customer may use a customer client device 105 to send a message to the picker client device 110. The order management module 220 receives the message from the customer client device 105 and transmits the message to the picker client device 110 for presentation to the picker. The picker may use the picker client device 110 to send a message to the customer client device 105 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models (e.g., co-occurrence model, embedding model, etc.) used by the online concierge system 140. In some embodiments, the machine learning training module 230 may also train models used by the AI system 125. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The datastore 240 stores data used by the online concierge system 140. For example, the datastore 240 stores bundles, updated bundles, item information, customer data, item data, order data, and picker data for use by the online concierge system 140. The datastore 240 also stores trained machine learning models trained by the machine learning training module 230. For example, the datastore 240 may store the set of parameters for a trained machine learning model on one or more non-transitory, computer-readable media. The datastore 240 uses computer-readable media to store data, and may use databases to organize the stored data.

Figure 3:
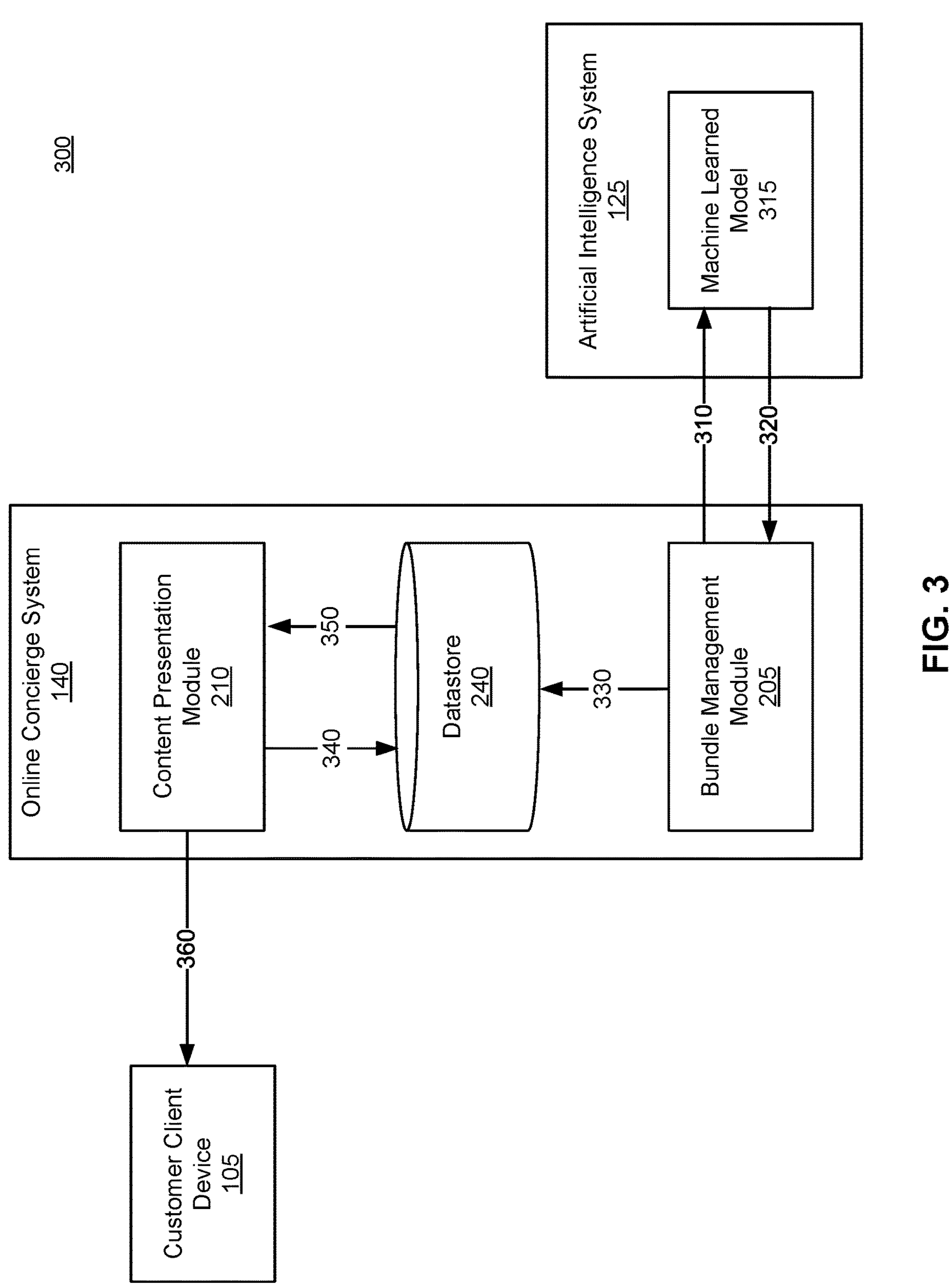
FIG. 3 is a diagram describing generation of updated bundles derived using an artificial intelligence system, in accordance with one or more embodiments.

FIG. 3 is a diagram 300 describing generation of lists of items associated with bundles derived using the AI system 125, in accordance with one or more embodiments. Alternative embodiments may include more, fewer, or different steps from those illustrated in FIG. 3, and the steps may be performed in a different order from that illustrated in FIG. 3. These steps may be performed using components of the system environment 100. Additionally, each of these steps may be performed automatically by components of the system environment 100 without human intervention. In some embodiments, the diagram 300 may be separated into two independent processes, a datastore update process and a bundle recommendation process.

The datastore update process occurs at steps 310, 320, and 330, and describes an embodiment of how the bundle management module 205 manages what bundles and/or updated bundles are in the datastore 240. The bundle management module 205 may generate a prompt to provide to a machine learned model. The prompt may instruct the machine learned model to determine one or more bundles for one or more different contexts (e.g., of a seed list of contexts). The bundle includes a list of products and/or product categories, and may also include a title for the bundle, an explanation that describes a relationship between the list of products and/or product categories, or both. The bundle management module 205 provides 310 the prompt to the AI system 125. The AI system 125 applies the prompt to a machine learned model 315 to generate one or more bundles for the one or more contexts. The AI system 125 provides 320 the generated bundles to the bundle management module 205. Note while the machine learned model 315 is shown as part of the AI system 125. In some embodiments, the machine learned model 315 is part of the online concierge system 140. In some embodiments, the bundle management module 205 updates some or all of the received bundles by, e.g., linking products in the list of products of each bundle to corresponding item information in an online catalog, and scoring the received bundles based in part on one or more scoring criteria (e.g., engagement metrics for item information, probability of co-occurrence of items, etc.). The bundle management module 205 may store 330 the updated bundles and/or the bundles in the datastore 240. In some embodiments, the bundle management module 205 may also perform de-deduplication on the updated bundles and/or bundles.

The bundle recommendation process occurs at steps 340, 350, and 360, and describes how the system environment 100 generates bundle recommendations. The content presentation module 210 queries 340 the datastore 240 for bundles and/or updated bundles for a given context. The content presentation module 210 receives 350 the requested bundles and/or updated bundles.

The content presentation module 210 may select, for a customer of the customer client device 105, a first bundle from the plurality of bundles in the datastore 240. The content presentation module 210 may determine a context (e.g., occasion) of potential interest to the customer based in part on customer data associated with the customer. For example, the customer data may indicate that the customer has purchased items (e.g., chips, soda, etc.) for the Super Bowl in the past. The content presentation module 210 may select a subset of the bundles in the datastore 240 that are associated with the Super Bowl based in part on titles of the bundles (e.g., Ultimate Game Day Feast). The content presentation module 210 may score each bundle of the subset. The content presentation module 210 may rank (based on their scores) bundles of the subset, and select a highest rank bundle as the first bundle.

The content presentation module 210 may generate a list of items from an online catalog that corresponds to a list of products and/or product categories of the first bundle. The content presentation module 210 may link each of the list of products and/or product categories to corresponding items.

The online concierge system 140 may provide 360 the list of items (determined using the first bundle) to the customer client device 105. The customer client device 105 may present an ordering interface for a storefront that includes a plurality of items for sale including the list of items. The list of items may be presented on the customer client device 105 as a single item that includes the title and the explanation of the first bundle.

In the case of updated bundles, the content presentation module 210 ranks (based on their scores) the received updated bundles for a given customer associated with the customer client device 105. The content presentation module 210 may adjust a score of an updated bundle based on, e.g., availability of items associated with the updated bundle. The content presentation module 210 selects one or more of the updated bundles based on their ranking (e.g., selects a highest ranked bundle for sending to the customer client device 105). The online concierge system 140 may provide 360 the selected one or more updated bundles to the customer client device 105.

Note, in some embodiments, the online concierge system 140 may adjust scores of the updated bundles based in part on whether or not they are selected for purchase. The content presentation module 210 may adjust a score of an updated bundle based on, e.g., availability of items associated with the updated bundle. The content presentation module 210 selects one or more of the updated bundles based on their ranking (e.g., selects a highest ranked bundle for sending to the customer client device 105).

Figure 4:
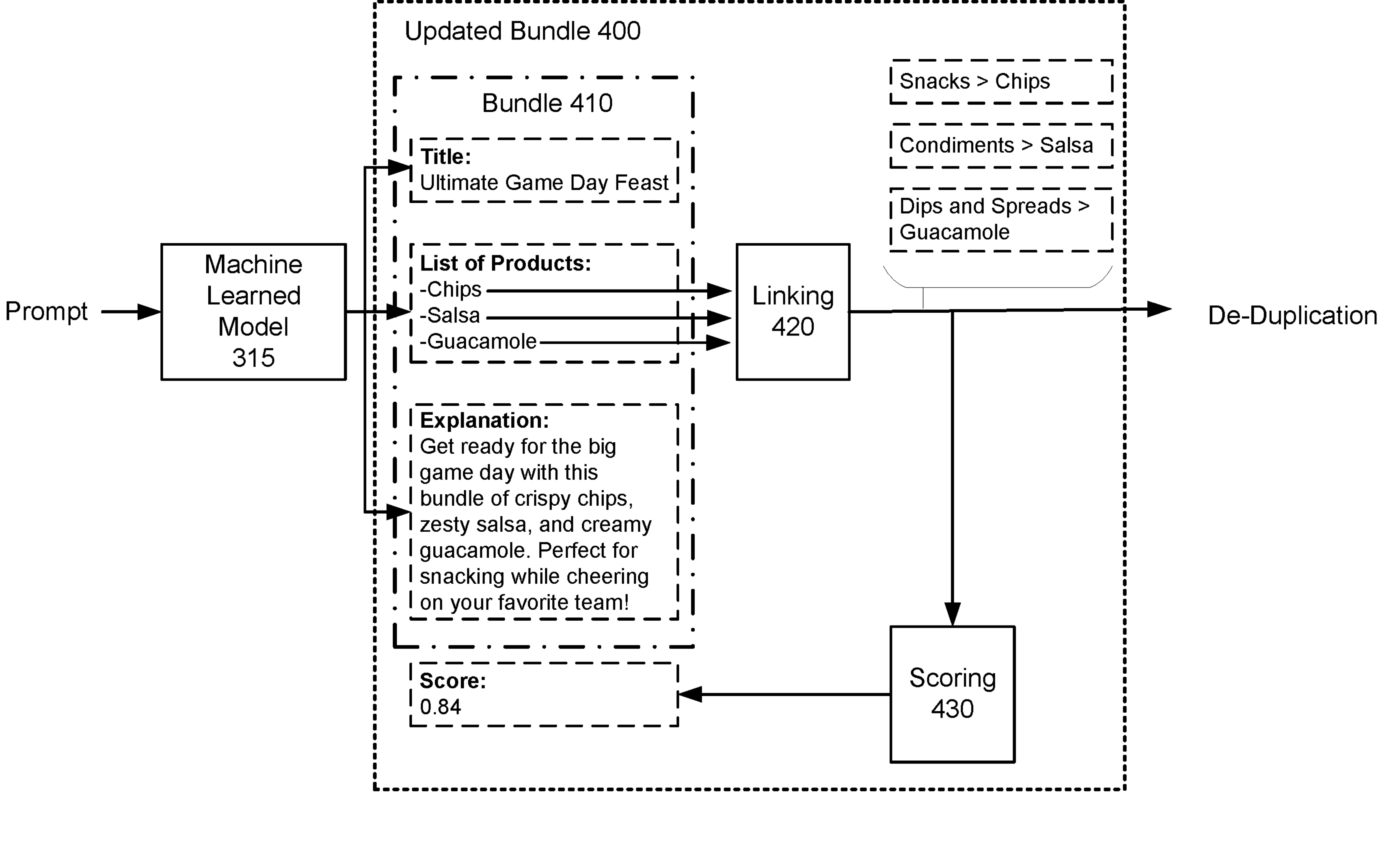
FIG. 4 is an example diagram illustrating formation of an updated bundle, according to one or more embodiments.

FIG. 4 is an example diagram illustrating formation of an updated bundle 400, according to one or more embodiments. Alternative embodiments may include more, fewer, or different steps from those illustrated in FIG. 4, and the steps may be performed in a different order from that illustrated in FIG. 4. These steps may be performed using components of the system environment 100. Additionally, each of these steps may be performed automatically by components of the system environment 100 without human intervention.

A prompt is provided to the machine learned model 315. The prompt instructs the machine learned model 315 to generate a bundle for a given context (e.g., the Superbowl). The machine learned model 315 may be part of the AI system 125 or the online concierge system 140. Responsive to the prompt, the machine learned model 315 generates a bundle 410. The bundle 410 includes a title, a list of products, and an explanation. In the illustrated embodiment, for the context of the Superbowl, the title is "Ultimate Game Day Feast," the list of products includes chips, salsa, and guacamole; and the explanation recites "Get ready for the big game day with this bundle of crispy chips, zesty salsa, and creamy guacamole. Perfect for snacking while cheering on your favorite team!"

The bundle 410 is linked 420 and scored 430 to update the bundle 410 to be the updated bundle 400. The list of products in the bundle 410 is linked 420 to item information of the online catalog. In the illustrated embodiments, each of the products are linked to item categories (e.g., snacks, condiments, and dips and spreads). In other embodiments, the products may be linked to corresponding specific items in the online catalog.

The updated bundle 400 and/or the bundle 410 may be scored 430 based in part on one or more scoring criteria (e.g., engagement metrics, probability of co-occurrence, etc.). For example, an engagement metric for item information (e.g., item and/or item category) associated with each product of the list of products may be determined, and the determined engagement metrics may be summed to form a score of the updated bundle 400 and/or the bundle 410. In the above embodiment, scoring criteria corresponds to the engagement metrics for the item information. In another embodiment, a co-occurrence model is used to estimate a probability that a set of item information (e.g., snacks, condiments, dips, and spreads) and/or products (e.g., chips, salsa, guacamole) in the list of products could be brought together, and the estimated probability is used as the score for the updated bundle 400 and/or the bundle 410. Note that the score for the updated bundle 400 and/or the bundle 410 may be adjusted based on, e.g., customer engagements with the updated bundle 400 (e.g., number of conversions associated with a particular bundle), item availability, some other factor, or some combination thereof.

In the illustrated embodiments, the updated bundle 400 may be compared with other updated bundles to remove semantically similar or duplicate updated bundles from a set of updated bundles that are available to provide to the customer client devices 105. In other embodiments, the bundle 410 is compared with other bundles to remove semantically similar or duplicate bundles from a set of bundles.

Figure 5:
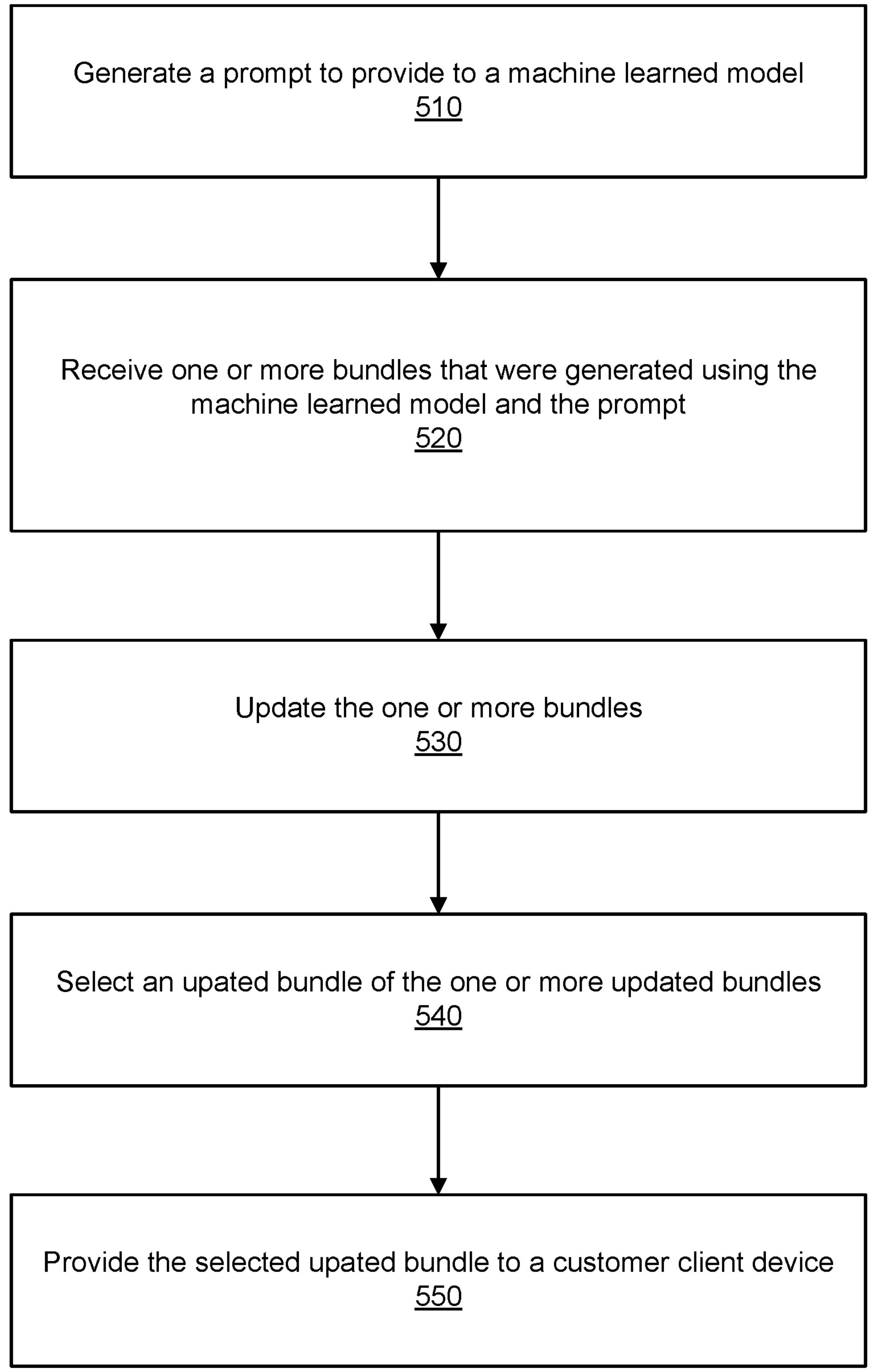
FIG. 5 is a flowchart for a method of generating updated bundles for e-commerce using artificial intelligence, in accordance with some embodiments.

FIG. 5 is a flowchart for a method of generating updated bundles for e-commerce using AI, in accordance with some embodiments. Alternative embodiments may include more, fewer, or different steps from those illustrated in FIG. 5, and the steps may be performed in a different order from that illustrated in FIG. 5. These steps may be performed by an online concierge system (e.g., online concierge system 140). Additionally, each of these steps may be performed automatically by the online concierge system without human intervention.

The online concierge system generates 510 a prompt to provide to a machine learned model. The online concierge system may generate the prompt using a bundle management module (e.g., the bundle management module 205). In some embodiments, a new prompt is generated. In some embodiments, generation of a prompt includes updating a previously generated prompt with new information. The prompt instructs the machine learned model to determine one or more bundles for each of one or more contexts. Each of the bundles includes a corresponding list of products and may also include a corresponding title and/or a corresponding explanation (that describes a relationship between the list of products). In some embodiments, the online concierge system provides the prompt to an AI system (e.g., the AI system 125) that includes the machine learned model. In other embodiments, functionality of the machine learned model is part of the online concierge system, and the online concierge system directly provides the prompt to the machine learned model.

The online concierge system receives 520 one or more bundles that were generated using the machine learned model and the prompt. Each of the received bundles include a respective list of products, and may also include a respective title and/or explanation. The online concierge system may receive the one or more bundles from the AI system. In other embodiments, the online concierge system receives the one or more bundles directly from the machine learned model.

The online concierge system updates 530 the one or more bundles. The online concierge system may update each of the one or more bundles by linking and scoring each bundle. The online concierge system may link products in the list of products of each bundle to corresponding item information in an online catalog. The online concierge system may score each bundle based in part on one or more scoring criteria (e.g., engagement metrics, probability of co-occurrence, etc.).

The online concierge system selects 540 an updated bundle of the one or more updated bundles. The online concierge system ranks (based on their scores) the updated bundles for a given customer associated with a customer client device (e.g., the customer client device 105). In some embodiments, the online concierge system selects one or more of the updated bundles based on their ranking (e.g., selects a highest ranked bundle for sending to the customer client device) and the context.

The online concierge system provides 550 the selected updated bundle to a customer client device (e.g., the customer client device 105). The customer client device 105 may present an ordering interface for a storefront that includes a plurality of items for sale including the selected updated bundle. Note, in some embodiments, the online concierge system 140 may adjust scores of the updated bundles based in part on whether or not they are selected for purchase.

In some embodiments, prior to selecting 540, the online concierge system de-duplicates the one or more bundles or the one or more updated bundles. In some embodiments, the de-duplication removes semantically similar or duplicate updated bundles from a set of updated bundles that are available to provide to the customer client devices. The online concierge system may group updated bundles of a plurality of updated bundles that include the one or more updated bundles, based in part on, e.g., having a high semantic similarity in titles, similarity of item information, or some combination thereof. The online concierge system may randomly select one updated bundle of each group to keep (e.g., would be available for presentation to the one or more customer client devices 105) and remove (i.e., would not be available for presentation to the one or more customer client devices 105) the remaining updated bundles. The online concierge system may form a de-duplicated set of updated bundles using the selected updated bundles. Note that while de-duplication is described above in the context of de-duplicating updated bundles, de-duplication may also be used on bundles (v. updated bundles).

Figure 6:
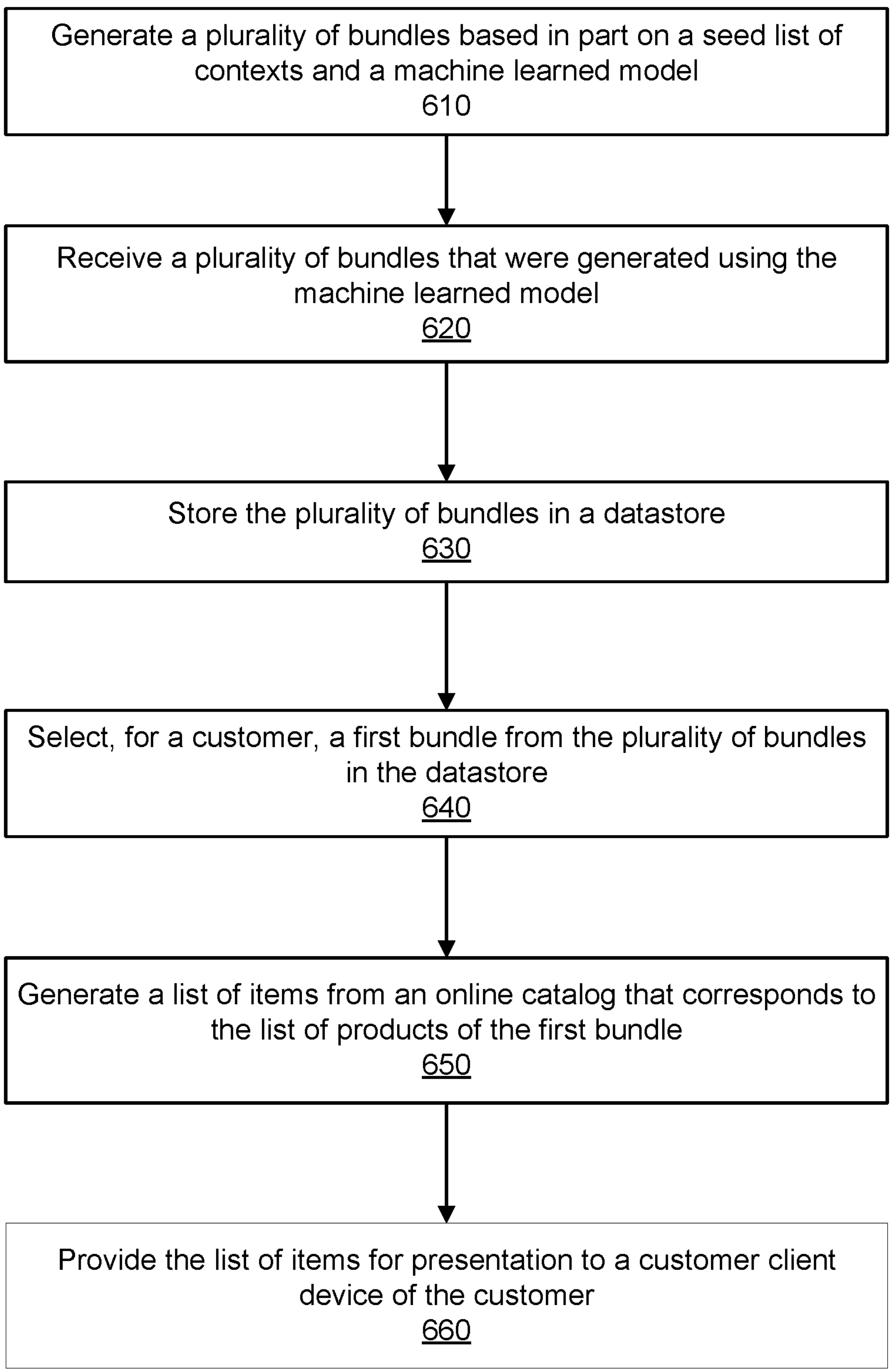
FIG. 6 is a flowchart for a method of generating lists of items associated with bundles for e-commerce using artificial intelligence, in accordance with some embodiments.

FIG. 6 is a flowchart for a method of generating lists of items associated with bundles for e-commerce using AI, in accordance with some embodiments. Alternative embodiments may include more, fewer, or different steps from those illustrated in FIG. 6, and the steps may be performed in a different order from that illustrated in FIG. 6. These steps may be performed by an online concierge system (e.g., online concierge system 140). Additionally, each of these steps may be performed automatically by the online concierge system without human intervention.

The online concierge system generates 610 generates a plurality of bundles based in part on a seed list of contexts by generating one or more prompts to provide to a machine learned model. And for a first context of the seed list of contexts, a prompt instructs the machine learned model to determine a first bundle for the first context. The first bundle includes a list of products, a title for the first bundle, and an explanation that describes a relationship between the list of products.

The online concierge system 620 receives the plurality of bundles that were generated using the machine learned model. The online concierge system may receive the plurality of bundles from the AI system. In other embodiments, the online concierge system receives the one or more bundles directly from the machine learned model. The online concierge system 630 may store the plurality of bundles in a datastore.

The online concierge system selects 640, for a customer, the first bundle from the plurality of bundles in the datastore. The online concierge system may determine a context (e.g., occasion) of potential interest to the customer based in part on customer data associated with the customer. For example, the customer data may indicate that the customer has purchased items (e.g., chips, soda, etc.) for the Super Bowl in the past. The content presentation module 210 may select a subset of the bundles in the datastore that are associated with the Super Bowl based in part on titles of the bundles (e.g., Ultimate Game Day Feast). The online concierge system may score each bundle of the subset. The online concierge system may rank (based on their scores) bundles of the subset, and select a highest rank bundle as the first bundle.

The online concierge system generates 650 a list of items from an online catalog that corresponds to the list of products of the first bundle. The content presentation module 210 may link (e.g., rule-based linking, embedding based linking, etc.) each of the list of products and/or product categories to corresponding items.

The online concierge system provides 660 the list of items for presentation to a customer client device of the customer. The customer client device 105 may present an ordering interface for a storefront that includes a plurality of items for sale, including the list of items that corresponds to the list of products of the first bundle. The list of items may be presented on the customer client device as a single item that includes the title and the explanation of the first bundle. Alternatively, the customer client device 105 may present an ordering interface for a storefront that includes a plurality of item types for sale, including the list of item types that corresponds to the list of products of the first bundle. The user can then select particular brands within the item types. In one or more embodiments, the online concierge system logs the user's interaction with the presented items and then uses the logs interactions to retrain and thereby improve the machine learning models.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

generating a plurality of bundles based in part on a seed list of occasion contexts by generating one or more prompts to provide to a generative model, wherein, for each occasion context of the seed list of occasion contexts, the one or more prompts instruct the generative model to determine:

a first bundle for a first occasion context, where the first bundle includes a list of products, a title for the first bundle, and an explanation that describes a relationship between the list of products;

storing the generated plurality of bundles in a datastore;

selecting, for a customer, a first bundle from the plurality of bundles in the datastore;

generating, using an embedding model, a first set of embeddings, each embedding in the first set of embeddings representing an item in an online catalog;

generating, using the embedding model, a second set of embeddings, each embedding in the second set of embeddings representing a product in the first list of products in the first bundle;

for each embedding in the second set of embeddings, generating similarity scores between the embedding and at least some of the first set of embeddings;

generating, based on the similarity scores, a list of items from the online catalog that corresponds to the list of products of the first bundle; and providing the list of items for presentation to a customer client device of the customer, wherein providing the list of items causes the list of items to be displayed by the customer client device as a single item that includes the title and the explanation of the first bundle.

2. The method of claim 1, wherein the generative model comprises a generative pre-training architecture.

3. The method of claim 1, wherein selecting, for the customer, the first bundle from the plurality of bundles in the datastore, further comprises:

determining an occasion based in part on information associated with the customer;

selecting a subset of the plurality of bundles that are associated with the occasion based in part on titles of the plurality of bundles, wherein the subset includes the first bundle;

scoring each bundle of the subset; and selecting the first bundle from the subset based in part on the scoring.

4. The method of claim 1, further comprising:

identifying a duplicate bundle, of the plurality of bundles, that includes the list of products of the first bundle, wherein the duplicate bundle is based in part on a second context that is different than the first context; and removing the duplicate bundle from the plurality of bundles.

5. The method of claim 1, further comprising:

generating similarities between the title of the first bundle to titles of other bundles of the plurality of bundles;

selecting a duplicate bundle from the plurality of bundles based in part on the determined similarities; and removing the duplicate bundle from the plurality of bundles.

6. The method of claim 1, further comprising:

monitoring engagement of the customer with one or more bundles of the plurality of bundles to generate engagement data;

wherein selecting, for the customer, the first bundle from the plurality of bundles in the datastore, further comprises:

applying the engagement data to a model trained to score each of the plurality of bundles and select a bundle with a highest score, wherein the bundle with the highest score is the first bundle.

7. The method of claim 6, further comprising:

removing bundles from the plurality of bundles whose scores are less than a threshold value.

8. A computer program product comprising a non-transitory computer readable storage medium having instructions encoded thereon that, when executed by a processor of a computer system, cause the processor to perform steps comprising:

generating a plurality of bundles based in part on a seed list of occasion contexts by generating one or more prompts to provide to a generative model, wherein, for each occasion context of the seed list of occasion contexts, the one or more prompts instruct the generative model to determine:

a first bundle for a first occasion context, where the first bundle includes a list of products, a title for the first bundle, and an explanation that describes a relationship between the list of products;

storing the generated plurality of bundles in a datastore;

selecting, for a customer, a first bundle from the plurality of bundles in the datastore;

generating, using an embedding model, a first set of embeddings, each embedding in the first set of embeddings representing an item in an online catalog;

generating, using the embedding model, a second set of embeddings, each embedding in the second set of embeddings representing a product in the first list of products in the first bundle;

for each embedding in the second set of embeddings, generating similarity scores between the embedding and at least some of the first set of embeddings;

generating, based on the similarity scores, a list of items from the online catalog that corresponds to the list of products of the first bundle; and providing the list of items for presentation to a customer client device of the customer, wherein providing the list of items causes the list of items to be displayed by the customer client device as a single item that includes the title and the explanation of the first bundle.

9. The computer program product of claim 8, wherein the generative model comprises a generative pre-training architecture.

10. The computer program product of claim 8, wherein the stored instructions to select the first bundle from the plurality of bundles in the datastore further comprises stored instruction that when executed cause the processor to perform steps comprising:

determining an occasion based in part on information associated with the customer;

selecting a subset of the plurality of bundles that are associated with the occasion based in part on titles of the plurality of bundles, wherein the subset includes the first bundle;

scoring each bundle of the subset; and selecting the first bundle from the subset based in part on the scoring.

11. The computer program product of claim 8, further comprising stored instructions that when executed cause the processor to perform steps comprising:

identifying a duplicate bundle, of the plurality of bundles, that includes the list of products of the first bundle, wherein the duplicate bundle is based in part on a second context that is different than the first context; and removing the duplicate bundle from the plurality of bundles.

12. The computer program product of claim 8, further comprising stored instructions that when executed cause the processor to perform steps comprising:

generating similarities between a first title of the first bundle to titles of other bundles of the plurality of bundles;

selecting a duplicate bundle from the plurality of bundles based in part on the determined similarities; and removing the duplicate bundle from the plurality of bundles.

13. The computer program product of claim 8, further comprising stored instructions that when executed cause the processor to perform steps comprising:

monitoring engagement of the customer with one or more bundles, of the plurality of bundles to generate engagement data;

wherein the instructions to select, for the customer, the first bundle from the plurality of bundles in the datastore, further comprise instructions that when executed cause the computer system to perform steps comprising:

applying the engagement data to a model trained to score each of the plurality of bundles and select a bundle with a highest score, wherein the bundle with the highest score is the first bundle.

14. The computer program product of claim 13, further comprising stored instructions that when executed cause the processor to perform steps comprising:

removing bundles from the plurality of bundles whose scores are less than a threshold value.

15. A computer system comprising:

a processor; and a non-transitory computer readable storage medium having instructions encoded thereon that, when executed by the processor, cause the computer system to perform steps comprising:

generating a plurality of bundles based in part on a seed list of occasion contexts by generating one or more prompts to provide to a generative model, wherein, for each occasion context of the seed list of occasion contexts, the one or more prompts instruct the generative model to determine:

a first bundle for a first occasion context, where the first bundle includes a list of products, a title for the first bundle, and an explanation that describes a relationship between the list of products;

storing the generated plurality of bundles in a datastore;

selecting, for a customer, a first bundle from the plurality of bundles in the datastore;

generating, using an embedding model, a first set of embeddings, each embedding in the first set of embeddings representing an item in an online catalog;

generating, using the embedding model, a second set of embeddings, each embedding in the second set of embeddings representing a product in the first list of products in the first bundle;

for each embedding in the second set of embeddings, generating similarity scores between the embedding and at least some of the first set of embeddings;

generating, based on the similarity scores, a list of items from the online catalog that corresponds to the list of products of the first bundle; and providing the list of items for presentation to a customer client device of the customer, wherein providing the list of items causes the list of items to be displayed by the customer client device as a single item that includes the title and the explanation of the first bundle.

16. The computer system of claim 15, wherein the generative model has a generative pre-training architecture.

17. The computer system of claim 15, wherein the stored instructions to select the first bundle from the plurality of bundles in the datastore further comprises stored instruction that when executed cause the computer system to perform steps comprising:

determining an occasion based in part on information associated with the customer;

selecting a subset of the plurality of bundles that are associated with the occasion based in part on titles of the plurality of bundles, wherein the subset includes the first bundle;

scoring each bundle of the subset; and selecting the first bundle from the subset based in part on the scoring.

* * * * *